Figure 1:
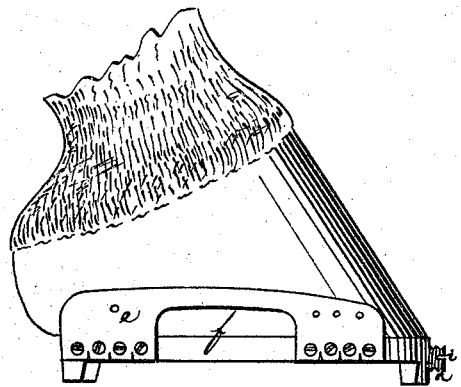

J. ROWE, Jr. & F. B. BROWN.

Horseshoes.

No. 142,282.

Patented August 26, 1873.

WITNESSES

L. H. D. Shepherd
James Walker

INVENTORS,

John Rowe Jr.
F. B. Brown

UNITED STATES PATENT OFFICE.

JOHN ROWE, JR., OF WILMINGTON, AND FRANCIS B. BROWN, OF BOSTON, MASSACHUSETTS.

IMPROVEMENT IN HORSESHOES.

Specification forming part of Letters Patent No. 142,282, dated August 26, 1873; application filed February 26, 1873.

*To all whom it may concern:*

Be it known that we, JOHN ROWE, Jr., of Wilmington, Massachusetts, and FRANCIS B. BROWN, of Boston, Massachusetts, have invented an Improved Horseshoe, of which the following is a specification:

The object of our invention is a horseshoe, which can be put on without the use of nails, and at the same time can be made as secure and as firmly fitted to the hoof of the horse as if nails were used.

It is well known that the use of nails in fastening shoes to the hoofs of horses is a source of injury to them, even when the shoeing is properly done, while if unskilfully done the injury may be very great, often, indeed, permanently injuring the horse.

By the use of the shoe invented by us all such dangers as those referred to are obviated. The shoe can be very quickly put on, even by a person without particular knowledge of horseshoeing; it is not liable to become loose; it can very easily be taken off: and, if it is desired to make the shoe expand slightly, this can easily be done.

Our shoe is constructed as follows: It is made, of course, of iron, and in two parts, which are united at the toe by a hinge. On the outermost side of each of these parts a flange is firmly fastened, and bent inward, so as to conform to the shape of the lower part of the hoof of a horse. This flange is open at the outermost part of the side of the hoof, so that no part of it shall project beyond the widest part of the hoof. At the toe we put a place for a screw, one-half of it being in each of the two parts of the shoe. In this is placed a hollow tapering screw, by which the shoe is locked or fastened.

In placing the shoe upon the hoof of the horse it may first be placed on one side of the hoof, and then the other side be adjusted; but particular description of the mode of adjustment will not be necessary, as any person of ordinary intelligence will perceive at once how to adjust the shoe. In putting the shoe on the screw is to be taken out of the shoe. When the shoe is in proper position the screw is to be inserted and screwed up so as to tighten the shoe as much as is desired. The mechanical action of the screw is somewhat like that of a wedge—that is, it forces the two parts more firmly against the sides of the hoof. The screw can be slightly loosened if at any time it is desired to expand the shoe, or to give more room to the hoof of the horse. The head of the screw is provided with a slot, and on each side of the toe of the shoe near the place for the screw is a corresponding slot. After the screw is adjusted a bent piece of wire is to be placed in the hole in the screw. The ends of this wire are to be inserted in the slot. The object of this is to prevent the screw from becoming loosened.

Figure 2:
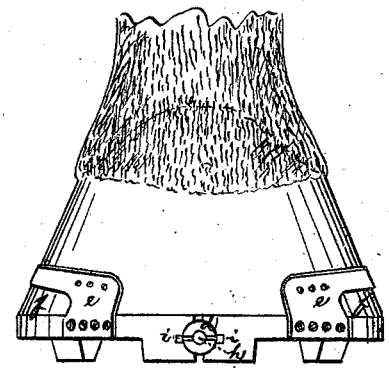
Figure 3:
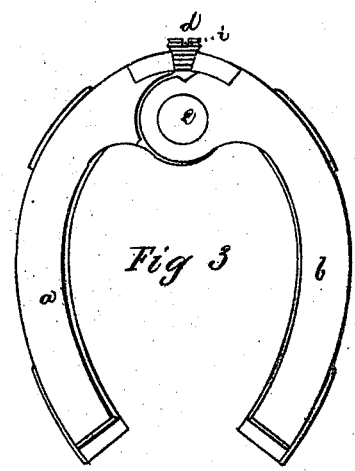

In the drawing, Figure 1 represents a side view of our horseshoe on the hoof of a horse; Fig. 2, a front view of the same; Fig. 3, a view or plan of our horseshoe.

*a* and *b* represent the two parts of our shoe; *c*, the hinge uniting the two parts. *d* is the screw, above described; and *e*, the flange, with its opening *f*.

Figure 4:

Fig. 4 shown the bent wire *g*, to be inserted in *h*, and the slots *i i*.

What we claim, and desire to secure by Letters Patent, is—

The improved horseshoe, made in two parts, united by a hinge at the toe, and secured to the hoof of the horse by means of a wedge-shaped screw at the toe, in combination with the flanges *e e* and bent wire *g*, substantially as described.

JOHN ROWE, JR.
F. B. BROWN.

Witnesses:
L. H. D. SHEPHERD,
JAMES WALKER.